E. EARLE.
Fishing-Rod.

No. 222,681.　　　　Patented Dec. 16. 1879.

WITNESSES:
Henry N. Miller
C. Sedgwick

INVENTOR:
E. Earle
BY Munn & Co
ATTORNEYS.

UNITED STATES PATENT OFFICE.

EDWARD EARLE, OF BROOKLYN, NEW YORK.

IMPROVEMENT IN FISHING-RODS.

Specification forming part of Letters Patent No. 222,681, dated December 16, 1879; application filed September 29, 1879.

*To all whom it may concern:*

Be it known that I, EDWARD EARLE, of Brooklyn, in the county of Kings and State of New York, have invented a new and useful Improvement in Joints for Fishing-Rods, of which the following is a specification.

Fishing-rods are usually made in sections united by slip-joints, the joints being made by metal ferrules on the ends of the wooden sections entering one within the other. In use water works in at the joints, and the wood inside the ferrule rots out quickly, so that the rod breaks.

The object of my invention is to construct a water-tight joint for fishing-rods to avoid the destruction of the rod by rotting; and the invention consists in providing the ordinary ferrules or tubes that are fitted to slip together with an annular cap or socket piece that covers the end of the outer tube and prevents water from working in.

The construction is shown in the accompanying drawings, and will be explained more particularly with reference thereto.

Figure 1:
Figure 2:
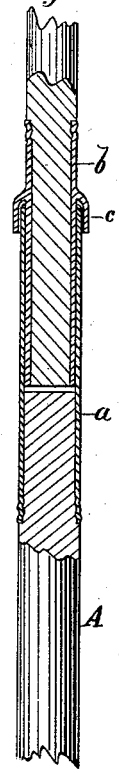

In the drawings, Figure 1 is an elevation of a fishing-rod constructed with the improved joint. Fig. 2 is a longitudinal section of the joint in larger size.

Similar letters of reference indicate corresponding parts.

A is a wooden rod, the sections of which are fitted at their ends with metal tubes or ferrules $a\ b$, that slide one within the other and form the slip-joint by which the sections are united. The sections of the rod, as usual, diminish in diameter from the butt to the end of the rod, and, the ferrules $a\ b$ corresponding, the exposed end of the ferrule is always toward the outer end of the pole, so that the water, getting on the pole from the line and running down toward the butt, works into the joint and socket. To prevent this I provide the smaller ferrule, $b$, at each joint with an annular band or socket-piece, $c$, to receive the end of ferrule $a$, so as to cover the same.

The parts are made to fit tightly, to render the joint water-proof. The band $c$ may be attached by soldering, riveting, or in any other desired manner, and is made wide enough to extend a short distance upon the ferrule $a$.

In use, the water running down the pole passes over the cap $c$, which prevents it from entering the joint. The joint being also water-tight, the water cannot work in from the other direction even when the pole is held with the butt highest, which is seldom the position of the rod.

The bottom of the socket formed by the band $c$ will be preferably rounded or tapered, and the end of the ferrule or tube entering therein tapered to correspond, so that the parts will fit together snugly.

It is to be understood that the rod may be made in two or more sections and the joint at each section fitted in the same manner, and that in case but one metal tube or ferrule is used to slip upon the wood the cap $c$ will be attached upon the wooden section directly.

The invention is especially useful with rods of bamboo, which are very light, but become soft and useless if water has access to the inside. When fitted with the improved joint such result is prevented.

Having thus described my invention, I claim as new and desire to secure by Letters Patent—

A jointed fishing-rod in which the sections are connected by tube $a$ and the capped tube $b\ c$, substantially as shown and described.

EDWARD EARLE.

Witnesses:
 GEO. D. WALKER,
 C. SEDGWICK.